United States Patent
North et al.

(10) Patent No.: US 6,700,217 B1
(45) Date of Patent: Mar. 2, 2004

(54) APPARATUS FOR CONVERTING OCEAN WAVE MOTION TO ELECTRICITY

(75) Inventors: Vaughn W. North, 8180 S. 700 East, Suite 200, Sandy, UT (US) 84070-0562; James J. Croft, III, Poway, CA (US); Kenneth Lawrence DeVries, Salt Lake City, UT (US)

(73) Assignee: Vaughn W. North, Sandy, UT (US)

( * ) Notice: Subject to any disclaimer, the term of this patent is extended or adjusted under 35 U.S.C. 154(b) by 0 days.

(21) Appl. No.: 09/646,235
(22) PCT Filed: Mar. 15, 1999
(86) PCT No.: PCT/US99/05710
§ 371 (c)(1), (2), (4) Date: Feb. 21, 2001
(87) PCT Pub. No.: WO99/46503
PCT Pub. Date: Sep. 16, 1999

Related U.S. Application Data

(63) Continuation-in-part of application No. 09/041,922, filed on Mar. 13, 1998, now Pat. No. 5,955,790.

(51) Int. Cl.$^7$ ............................ F03B 13/12; H01L 41/08
(52) U.S. Cl. ............................ 290/53; 290/42; 310/339; 310/337
(58) Field of Search .............................. 290/42, 43, 53, 290/54; 310/337, 339

(56) References Cited

U.S. PATENT DOCUMENTS

| | | | | |
|---|---|---|---|---|
| 4,313,059 A | * | 1/1982 | Howard | 290/54 |
| 4,404,490 A | * | 9/1983 | Taylor et al. | 310/339 |
| 4,685,296 A | * | 8/1987 | Burns | 60/497 |
| 4,781,023 A | * | 11/1988 | Gordon | 60/506 |
| 5,105,094 A | * | 4/1992 | Parker | 290/53 |
| 5,438,553 A | * | 8/1995 | Wilson et al. | 367/140 |
| 5,500,635 A | * | 3/1996 | Mott | 340/323 R |
| 5,578,889 A | * | 11/1996 | Epstein | 310/339 |
| 5,955,790 A | * | 9/1999 | North | 290/53 |
| 6,091,159 A | * | 7/2000 | Galich | 290/1 R |
| 6,109,029 A | * | 8/2000 | Vowles et al. | 60/398 |
| 2002/0047273 A1 | * | 4/2002 | Burns et al. | 290/53 |

FOREIGN PATENT DOCUMENTS

| | | |
|---|---|---|
| GB | 2 282 188 A | 3/1995 |
| JP | 10103215 | 4/1998 |

* cited by examiner

Primary Examiner—Nicholas Ponomarenko
(74) Attorney, Agent, or Firm—Thorpe North & Western, LLP

(57) ABSTRACT

A power transfer system for converting recurring wave movement within the ocean to electrical energy. The system comprises pressure sensing structure such as a pressure transducer 10 or combination movable magnet and coil 50, positioned below water level and at a location 20 of wave movement for (i) registering changes in height of water 18 and 19 above the pressure sensing structure 10, 50 and (ii) providing electrical power output at the ocean floor corresponding to changes in gravity force associated with the changes in the height of water. A transfer medium 12 is coupled at one end to the pressure sensing structure and extends at a second end to a shore location. A power receiving device such as a bank of storage batteries 14 or electrical load is coupled to the transfer medium at the shore location for receiving the power output from the transfer medium and for processing the power for use.

29 Claims, 4 Drawing Sheets

APPARATUS FOR CONVERTING OCEAN WAVE MOTION TO ELECTRICITY

This application is a continuation-in-part of Ser. No. 09/041,922 filed Mar. 13, 1998 now U.S. Pat. No. 5,955,790.

FIELD OF THE INVENTION

The present invention relates to methods and devices for converting the energy from ocean or water waves to useful energy. More particularly, the present invention relates to the conversion of periodic wave motion present near beaches of the ocean to useful electrical energy.

PRIOR ART

Since the beginning of time, man has viewed the power of the oceans with awe and has long sought methods for harnessing this power for useful purposes. Perhaps one of the greatest forms of natural energy associated with the oceans is the recurring waves action that define the constantly changing boarders to these massive bodies of water. Powered by gravitational forces of the moon and changing weather conditions of wind, temperature and rain, the ever changing tides and propagation of wave motion across the water surfaces of the earth generate an immeasurable force which continually pounds virtually every exposed shoreline of every continent of the world.

Attempts to tap this source of energy have experienced only nominal success. Whereas development of hydroelectric power sources on rivers has been a simple matter of applying a turbine to a moving stream of water, the capture of water movement of periodic waves has been a formidable challenge. Hundreds of devices have been contrived to directly respond to the ocean movements; however, few have survived the test of general commercial application. Typical approaches to this problem have included the use of tethered paddles, buoys and a myriad of other floating objects designed to move laterally with the currents in a rhythmic pattern, while transferring this energy to a mechanical linkage capable of generating electrical output.

A primary flaw in such systems arises from the surface location, or at least suspended linkage to surface structure, providing a dependence upon lateral interaction of moving mechanical parts with surface wave action to provide the medium of transfer of force from the oceans to a power generator. Such mechanical assemblies are not only expensive, but require regular maintenance and repair due to changing weather conditions at the surface, which are manifest in severe forces capable of crushing the strongest of structures. In addition, the constantly changing tides mandate complex height adjustment mechanisms to adjust to changing water levels. The resulting variations in operating conditions make it difficult to provide a single system that is capable of coping with the multitude of variables which must be satisfied in a surface-linked mechanical system of energy conversion.

What is needed is a power generation system which operates in response to the periodic wave motion of the waters, but in a manner independent from other surface water conditions to produce electrical energy. The system must be economically feasible by favorably balancing cost of energy production versus kilowatt output.

OBJECTS AND SUMMARY OF THE INVENTION

It is an object of the present invention to capture energy from recurring wave motion of water by indirect conversion of vertical motion to electrical power output.

It is a further object of the invention generate electrical power in response to changing weights of water over a fixed, submerged surface as a function of time.

Yet another object of this invention is to develop conversion of wave motion to electrical power without depending upon moving objects suspended within the water.

A still further object of this invention is the conversion of tidal energy and recurring wave motion to electrical energy indirectly based on changes in weight of the water as it flows onto and recedes from the beach in a recurring manner.

These and other objects are realized in a power transfer system which includes a, pressure transducer positioned at the ocean floor and under a location of wave movement configured for (i) registering changes in height of water in alternating crests and troughs above the pressure transducer and (ii) providing an electrical power output at the transducer corresponding to changes in force associated with the changes in the height of water. Other benefits and features will be apparent to those skilled in the art, based on the following detailed description, taken in combination with the accompanying drawings.

DETAILED DESCRIPTION OF THE INVENTION

The present invention arises from the observation that indirect conversion of wave movement to electrical energy could avoid the mechanical limitations previously experienced with surface-linked paddles, wheels and floating systems. The challenge is how to capture the movement of surface water in a reciprocating manner without being subject to physical wear or damage resulting from the sometimes violent thrust and receding movement of powerful ocean waves. Indeed, a common perception within the prior art was to accept the limitation that conversion of the power of ocean tides and waves required a device that would respond to this surface wave movement, and then convert this motion to rotary movement within a turbine or some other energy transfer medium An inspection of the hundreds of devices and methods which have attempted to tap the ocean's energies quickly reveals this common paradigm.

The present invention adopts a new approach of indirect power conversion of surface wave action to an electromechanical transducer positioned on the ocean floor. Instead of focusing on the lateral movement of the ocean waters as the source of power, the new paradigm involves considering the vertical force applied by the wave action of the moving waters. In simple terms, the invention arises with the observation that the wave movement of water is accompanied by a change in water level at the surface, and an accompanying change in water depth. This variance in depth provides an immediate variation in weight, as recurring greater and lesser volumes of water occur over any given area of submerged beach or ocean floor. In essence, the recurring rise and fall of water level can be viewed as a pumping mechanism which operates with normal damage associated with the severity of weather conditions at the ocean surface. Indeed, the more severe the weather and wave action is, the greater is the energy input to the ocean, leading to greater and more frequent variation in depth changes.

In basic terms, the present energy transfer system can be viewed as a column of water which varies in height in a recurring manner. This changing column of water possesses a gravitational force corresponding to the height of water above the ocean floor. The recurring waves constantly vary this height between the maximum height of any given wave and the lowest level water possible when the wave has receded. The difference in height represents an oscillating force and applied load (dependent upon the mass of the water) which can be directly converted on the ocean floor to other forms of potential or kinetic energy. The recurring nature of this changing volume enables simulation of a pumping force, powered by gravity and developed indirectly by the wave action of the ocean.

Figure 1:
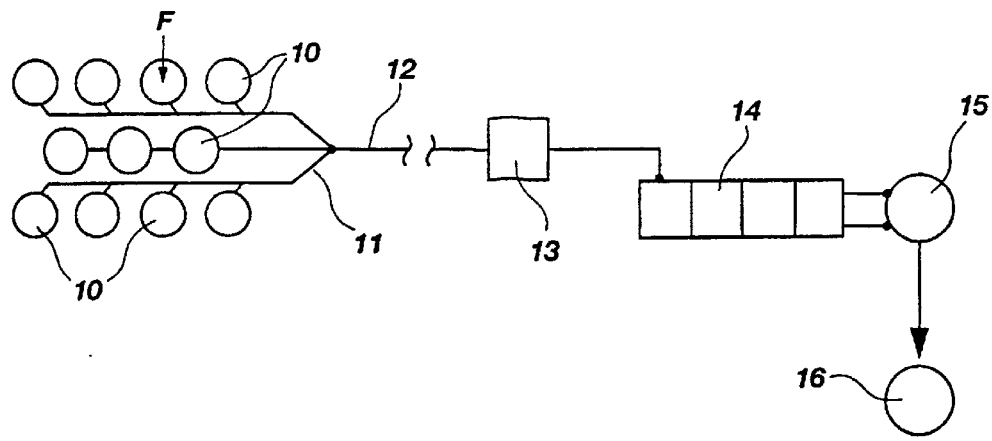
FIG. 1 graphically represents an array of pressure transducers coupled to a battery storage system, including access to utility power transfer lines.

FIG. 1 illustrates a conversion medium substantially free from the direct surface movement associated with currents and tides. Here again, this aspect of the invention arises with the observation that power transfer from the recurring wave action can be realized below the water level, at the ocean floor. This consideration requires an additional shift in paradigm to recognize that the sand base below the ocean water can be used as a pressure transfer medium for passing the changing load of the column of ocean water into a form of electrical energy within a somewhat protected environment, free from radical currents and possible attack of sea life. In fact, the fluid nature of sand and its excellent compaction characteristics provides an ideal medium for this energy transfer and conversion.

Accordingly, one embodiment of the present invention utilizes an array of pressure sensitive devices, such as piezoelectric pressure transducers 10, which are individually coupled to a conductive wire 11, which interfaces with a common conductor 12. This embodiment of the invention applies the capacity of piezoelectric material to convert an applied physical stress to voltage output. For example, numerous piezoelectric materials are known which are applied in microphone devices, stress meters, etc., which provide an analog output voltage proportional to the applied change in stress or loading. Typically, this voltage is used to measure changes in applied stress to a mechanical component and is coupled to a meter and associated circuitry to define an analog measurement of the applied load. In the present invention, the changing weight applied by the column of water can be used to develop a physical change on the piezoelectric material, resulting in a voltage output. This output voltage causes current flow along the coupled wires 11 and 12 to a battery storage unit 13. Electric power is stored in the battery based on the continual current flow supplied by the recurring wave action.

The mathematical relationship between current and applied load is dependent upon the specific piezoelectric material selected. Those skilled in the art of piezoelectric materials have developed representative constants which predict the surface charge density of selected materials. Calculations based on the dimensions of the transducer material and applied force demonstrate that current flow can be regularly pumped from a submerged array of transducers below a changing load supplied by wave action of the ocean. For example, it is estimated that a one square meter array of barium titanate having a thickness of one centimeter can supply up to 0.000013 amps with a changing applied force of one newton, based on the relationship:

$$\text{Current} = 0.000013 \times \text{Force}^2$$

Therefore, ten newtons can yield up to 1.3 ma of current. Although the current flow may be perceived as nominal, the ability to place thousands of transducer arrays which respond every few seconds with a new surge of current, when multiplied over years of maintenance free operation, can represent a significant source of energy. The use of battery storage units 14 permits the accumulation of such micro energy pulses to establish commercial applications for the energy conversion system. A diode gate 13 or other unidirectional current regulator provides a simple check against reverse drainage of power from the battery storage system 14. Appropriate connections can be made to a utility company 15 for power distribution to consumers 16.

Figure 2:
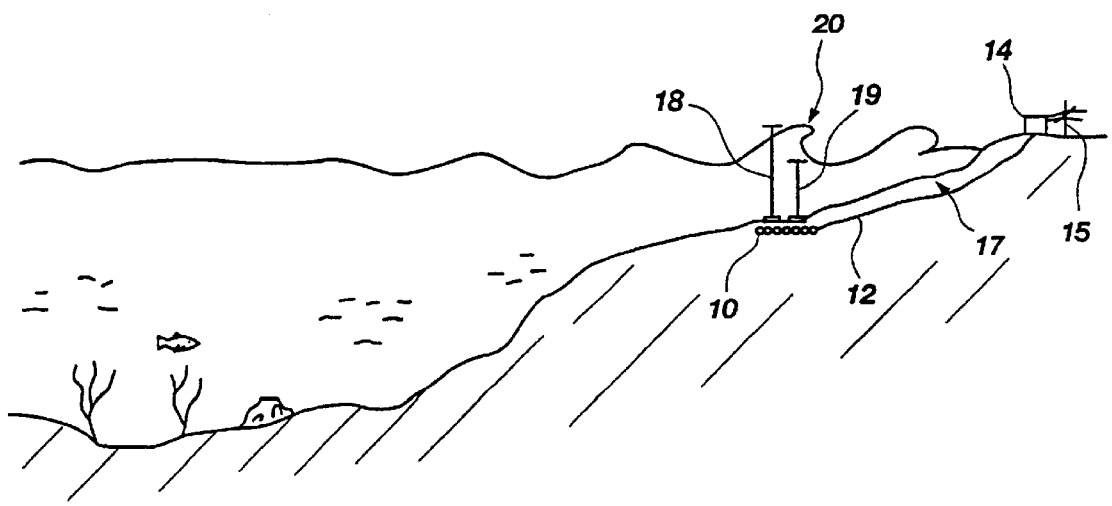
FIG. 2 represents a cross section of ocean beach which has been modified with a wave energy transfer system as shown in FIG. 1.

FIG. 2 graphically illustrates one embodiment of positioning such a transducer array below the sea bed or beach area 17. The array of transducer material 10 is positioned several feet below the transient surface of sand. Appropriate protective coatings such as polyurethane or some other material can be applied to minimize exposure to water. This location will typically be sufficiently close to the shore so that installation can be readily accomplished during low tide.

This material can be laid in long strips, with a common lead 11 being coupled to a single wire 12 which is connected to a battery storage unit 13 and buried a safe distance below ground.

Once in position, the transducer material remains static and should require little or no maintenance. Nevertheless, each few seconds brings a new wave 20, giving a rise in water level and attendant change in applied force. This pressure loads the transducer material, generating a pulse of current which is transmitted to the battery storage unit 13. The amount of current will depend upon the change of water level from peak or crest wave height 18 to trough level 19. This recurring shift every several seconds will continue to pump energy to the system for decades, with little additional expense beyond installation and initial cost of materials.

Figure 3:
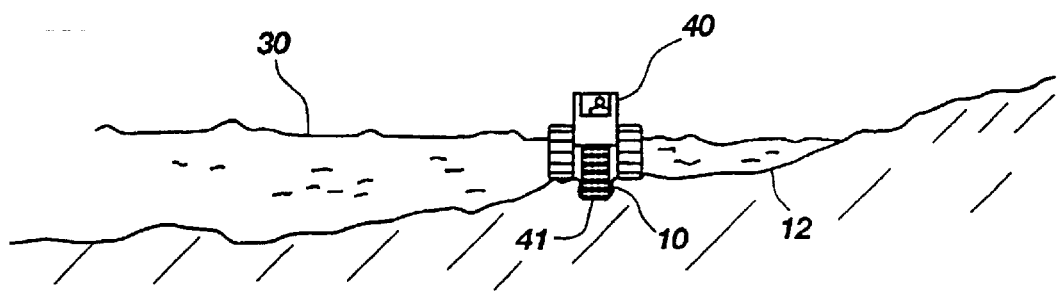
FIG. 3 graphically illustrates a process for laying a grid of pressure transducers within a fluidized trench under the beach area of an ocean water source.

FIG. 3 illustrates one method for positioning the subject invention at an operable location. First, a trench 41 is excavated along a section of ocean floor 17 below a region of ocean water 30 which is subject to constantly changing water elevations. A trenching device 40 travels along the ocean floor 12. The mat of transducers 10 is buried within the trench 41 at a depth which protects the transducer mat 10 from adverse exposure to ocean currents and sea life.

One method for excavating the disclosed trench 41 involves fluidizing sand and silt at the ocean floor 14 to form the trench as a liquid slurry. The transducer mat is laid within the fluidized sand and silt, which then is allowed to settle over and bury the transducer mat to a desired depth. The mat is then connected by means of a conductive wire 17 to the shoreline where it may be coupled to storage batteries or electrical devices. It will be apparent to those skilled in the art that numerous methods can be utilized to lay the transducer mat 10 at the ocean floor to establish a stable, stationary position with respect to the changing height of water overhead.

Figure 4:
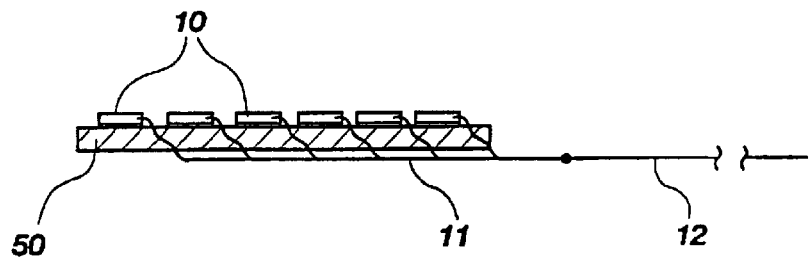
FIG. 4 illustrates a mat of transducers secured to a rigid grid support for placement at the ocean floor, under several feet of sand, with a connecting wire for attachment to a power storage bank.

FIG. 4 shows a mat of transducers 10 secured to a rigid grid support 40 for placement at the ocean floor as illustrated above. A connecting wire 11 couples the respective transducers 10 to a power storage bank 14. The rigid grid support 40 supplies the stiffness for supporting the mat of transducers 10 as described above.

Figure 5:
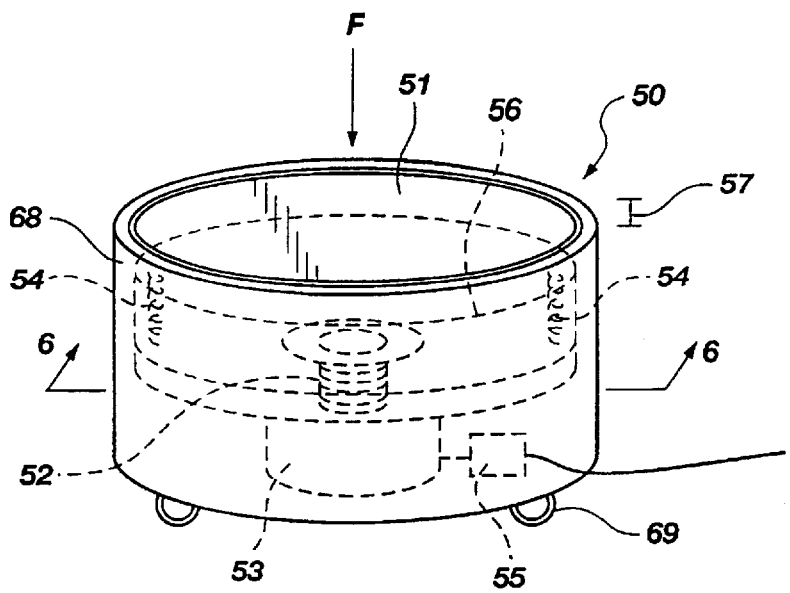
FIG. 5 shows another embodiment of the present invention wherein electricity is developed by the relative movement of a magnet with respect to a coil, biased to a return position by a spring.

Other embodiments of the present invention representing a direct conversion of water force through a transducer on the ocean floor will be apparent to those skilled in the art from the following discussion. For example, FIG. 5 depicts a graphic representation of a fully enclosed, submersible drum 50 which contains a moveable head plate 51 coupled to the combination of a coil 52 moving in a field of a magnet 53 or alternately, a magnet moving in a fixed coil. As overhead waves roll across the drum, the changing weight of overhead water exerts a changing gravity force F, which develops movement of the head plate 51 against the fixed resistance of a return biasing force such as springs 54. Phantom configuration lines 56 illustrates the displacement 57 of the head plate 51 under a wave peak overhead. As the following wave trough passes over, the gravity force F decreases to its minimum value and the restoring forces of the springs 54 displace the head plate 51 upward to the raised, rest position. The resulting relative reciprocating movement of the coil and magnet induces an electromotive force which generates voltage and current production, similar to the current output of the piezoelectric embodiment. The output and efficiency of this system, however, is significantly higher than that which could be supplied by currently known piezoelectric systems as described above.

Figure 6:
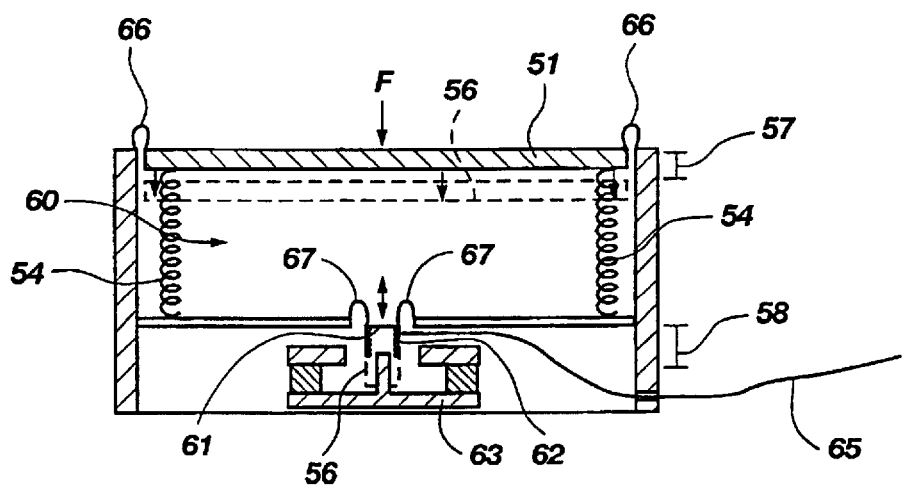
FIG. 6 is a cross-section of FIG. 5, taken along the lines 6—6.

FIGS. 5 and 6 further illustrate a displacement enhancement feature which converts the small displacement 57 of the head plate 51 to an increased displacement 58. This feature is enabled by use of a compression chamber 60 which has a fixed volume, except for the volume changes which result from displacement of the head plate 51 and a smaller, secondary plate 61. The smaller surface area of the secondary plate 61 results in substantially greater linear displacement 58 into a conversion chamber which allows the secondary plate to move in an unrestrained manner. This conversion chamber may be gas filled to protect electrical conversion components (magnets 63 and coil 62) from adverse contact with ocean water. The larger excursion path of the secondary plate 61 results in a corresponding enlarged path for the attached coil 62 through the magnetic field of magnet 63, leading to increased current production which is transmitted through attached lead 65 to the shoreline. A diode or rectifier bridge 55 rectifies polarities to provide continuous current flow to the battery system or electrical device 14.

The subject drum 50 may be made of concrete, plastic, ceramic, noncorrosive metals or other suitable materials which can withstand extended periods of submersion in ocean water. Preferable compositions should have sufficient density to overcome any buoyancy of the drum. Alternatively, securing loops 69 or other forms of anchoring means can be installed to enable secure fixation at the ocean floor. Concrete construction appears to offer the preferred density, as well as durability for extended life and reduced cost. Flexible surrounds 66 and 67 similar to speaker surrounds in audio products provide displacement capacity to the respective head plate 51 and secondary plate 61 while preserving a complete seal on the respective chambers. Once the conversion unit is fully assembled and sealed, a protective polymer coating or encasement 68 can be applied as a complete exterior seal. The device should therefore be able to operate for years without significant maintenance requirements.

Although a common fluid such as air may be preferred in the respective chambers to minimize differential compression rates when submerged, it is envisioned that the device will commonly be placed at lesser depths of water such as occur near the shoreline to maximize the relative change in gravity weight with each passing wave. Pressure influence at these levels should be nominal. Such shallow depths offer greater percentage variations in weight, which enable greater relative displacement of the coil and magnet. For example, a drum positioned under water at low tide may experience overhead waves of 3 to 10 feet in height. Assuming a depth of five feet for the head plate during a wave trough, the column height of overhead water will alternate between eight and fifteen feet. This is equivalent to a doubling of weight with every wave period. If high tide raises the water level another ten feet, then the height variation will range from eighteen to twenty-five feet, providing approximately a thirty percent variation in wave height. Moving the device to depths of 100 feet would quickly reduce the percent variation of weight and resulting displacement to a mere 5–6 percent. It will be apparent that actual design parameters will depend upon the unique characteristics of placement locations, anticipated ocean depths and relative water height variations. Resistive spring values for springs 54, plate dimensions, internal pressure levels, magnet and coil configuration and displacement ranges will require integration to maximize electrical output. With the explanation provided herein, these design considerations are well within the skill of the ordinary artisan.

Figure 7:
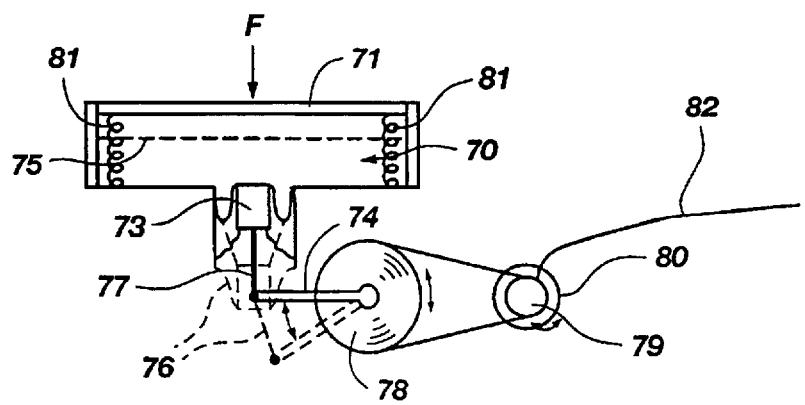
FIG. 7 represents an additional embodiment using a piston configuration with leveraged force for conversion of linear motion to rotary motion in combination with a generator.

FIG. 7 illustrates an adaptation of the previous embodiment with linkage from a compression chamber 70 and head plate 71, through a piston member 73 to a lever arm 74. Similar principles of operation provide for displacement of the head plate 71 under changing gravity force F to a depressed position 75. This displacement is enhanced by the smaller surface area of the piston 53, yielding greater linear movement as shown by phantom lines 76. Accordingly, the piston arm 77 drives the attached wheel 78 in rotation. Further enhancement of comparative head plate displacement is accomplished by reduction in diameter of drive wheel 79, which is attached to a rotary generator 80 which is axially coupled to the drive wheel 79. The occurrence of a wave trough allows the biasing springs 81 to return the head plate to an original raised position. Lead 82 couples the electrical output to a rectifier for processing the alternating signal to DC or rectified AC.

Figure 8:
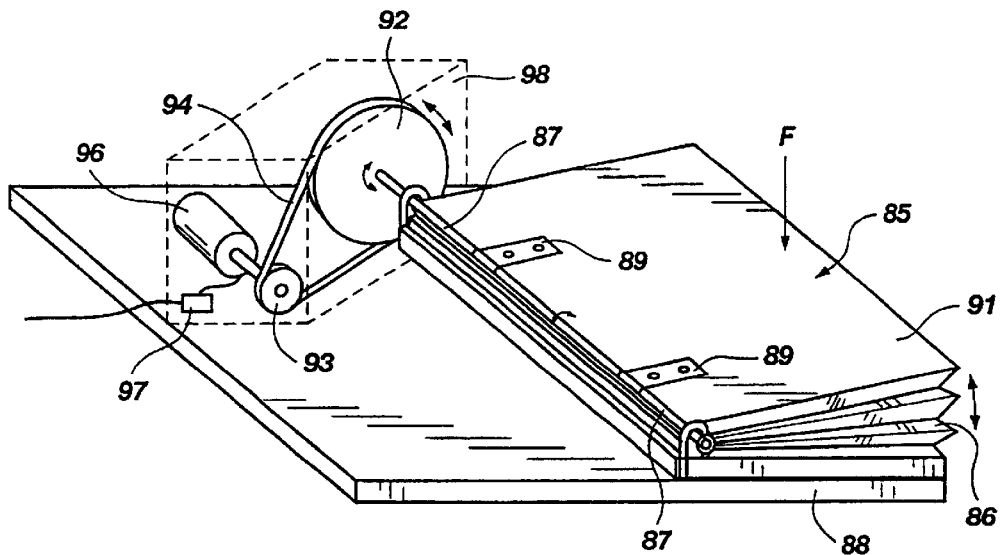
FIG. 8 shows a perspective view of a billows device coupled to a rotary power conversion generator.

An additional embodiment of the present invention is shown in FIG. 8. This device includes a bellows 85 with collapsible walls 86. A protective head plate 91 responds to changes in gravity force F based on the column weight of the overhead water. The return force may be contained air, a restoring spring, or a combination of both. The illustrated embodiment includes an axial rotation rod 87 rigidly coupled by braces 89 to the head plate 91 such that reciprocating movement of the bellows results in axial rotation of the rod 87. This rod is anchored along its rotational axis to a base plate 88 for structural alignment. One end of the rod 87 is coupled to a primary drive wheel 92, which is coupled to a secondary, smaller drive wheel 93 by a drive chain 94. The secondary drive wheel powers a rotary generator 96, which supplies alternating current to a rectifier 97 at a frequency corresponding to the periodicity of the wave action. The mechanical drive system is contained within a housing 98.

Figure 9:
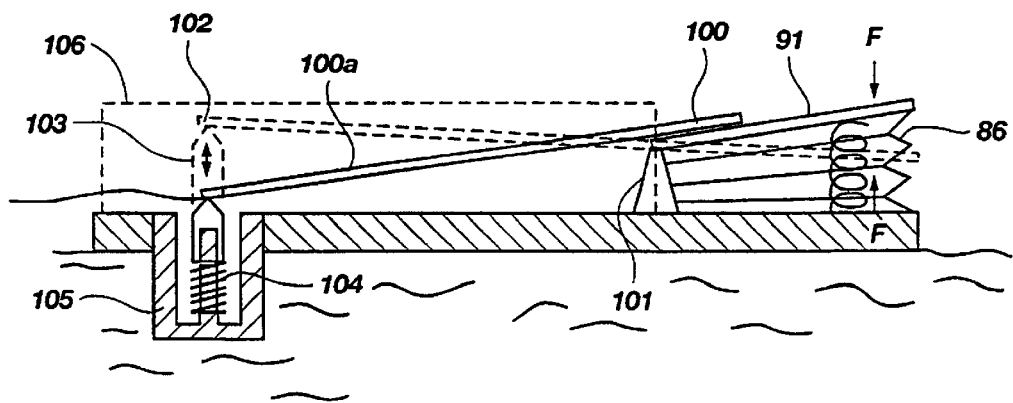
FIG. 9 depicts a graphical cross-section of a lever arm powered by a billows device and coupled to linear electrical generator.

The same bellows of FIG. 8 can be modified in FIG. 9 for linear conversion of bellows movement to electrical output. In this version, the head plate 91 includes a lever arm 100 which is pivotally anchored to a fulcrum 101. As the bellows reciprocates in response to overhead wave action, the lever arm is raised and lowered. Displacement enhancement is provided by the longer section of lever arm 101 a on the left side of the fulcrum. Accordingly, the remote end 102 of the lever arm moves along a larger vertical path than the bellows displacement. A harness 103 suspends a coil 104, which moves through a magnetic field generated by magnet 105, generating the desired current. A housing 106 protects the moving parts from the ocean environment.

Figure 10:
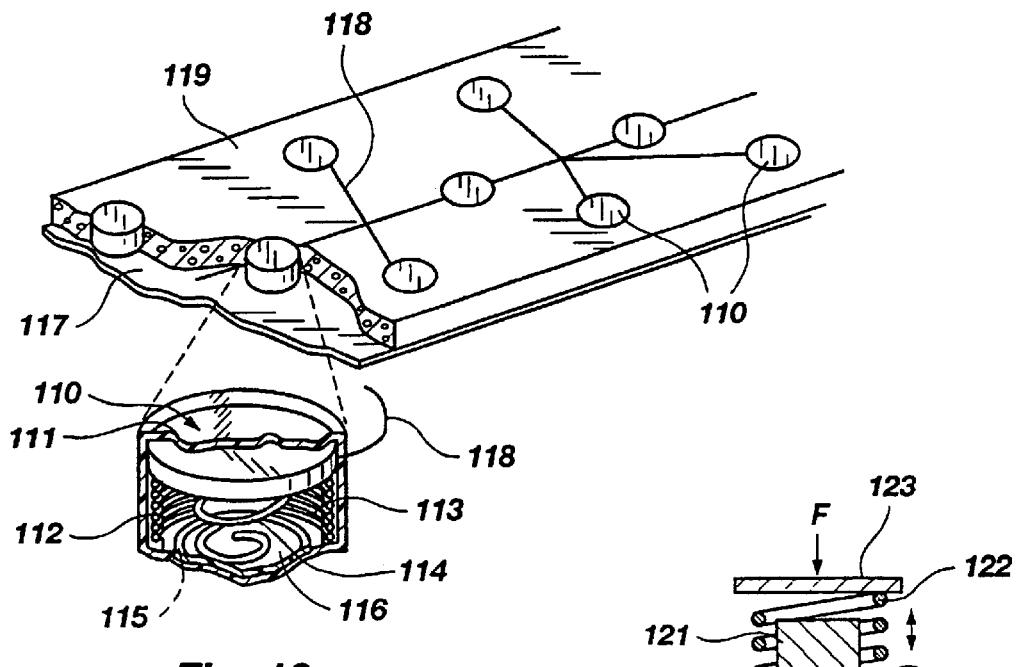
FIG. 10 illustrates an additional embodiment of-a magnet/coil generator in a mat.

The magnet and coil combination can also be embodied in a mat configuration, similar to that illustrated in FIG. 4. For example, FIG. 10 depicts an array of separate magnet/coil pods 110 which provide the relative magnet/coil movement in response to changing weight of the overhead water. Each pod is contained in a thin plastic housing 111 which seals the magnet 112 and coil 113 from corrosive action of the sea water. A spring mechanism 114 biases the magnet 112 in a raised position, yet has sufficiently low stiffness to allow the supported magnet 112 to readily depress under increasing weight of a rising wave crest overhead. Current from the coil is transmitted by a connecting wire 118. The thin plastic housing is sufficiently loose around the coil to permit the magnet to easily displace within the volume enclosed by the coil. The coil may actually be encased in a rigid plastic wall (phantom lines 115) to retain fixed coil orientation as the magnet reciprocates with the wave action. A stiff support plate 116 provides resistance against vertical movement of the spring mechanism, and maybe further supported by a rigid base 117. A surrounding mat 119 retains the array of pods in place. It will be apparent that the number of pods in an actual mat configuration would be much greater in density to maximize current generation from overhead wave action.

Figure 11:
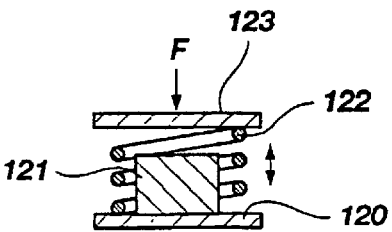
FIG. 11 shows a variation of the magnet/coil combination.

An additional modification of the magnet/coil combination is shown in FIG. 11, wherein the spring means for movably supporting the magnet is the coil itself. A base plate 120 supports a magnet 121 within the field volume of the coil 122 and in fixed position. The coil 122 contracts periodically in response to the force F applied to a head plate 123, causing the required relative movement of the coil with respect to the magnet 121. This embodiment offers some advantage in simplicity and cost reduction; however, sacrifices some strength of field interaction in view of limited movement of the coil. By using large arrays of supermagnets (neodinium magnets) having extreme high field strength, sufficient current can be generated for a workable system.

It is to be understood that the numerous disclosed embodiments are provided to illustrate the broad inventive principles of this invention and are not intended to be limiting, except by the following claims.

What is claimed is:

1. A power transfer system for converting recurring wave movement within the ocean to electrical energy, said system comprising:

pressure sensing structure positioned at a stationary location at an ocean floor below water level and below a location of wave movement for (i) registering changes in height of water above the pressure sensing structure and (ii) providing an electrical power output at the ocean floor location corresponding to changes in force associated with the changes in the height of water;

a transfer medium coupled at one end to the pressure sensing structure and extending along the ocean floor to a second end at a shore location adjacent the location of wave movement, said transfer medium including means for transmitting the electrical power output of the pressure sensing structure to the shore location; and electrical power receiving means coupled to the transfer medium at the shore location for receiving the electrical power output from the transfer medium and for processing the electrical power output to a useful form of energy.

2. A power transfer system as defined in claim 1, wherein the pressure sensing structure comprises a pressure transducer which responds to changes in pressure of water and supplies the electrical power output as an output voltage.

3. A power transfer system as defined in claim 2, wherein the pressure transducer comprises a piezoelectric material which responds to changes in pressure to produce the electrical power output, said transfer medium comprising a conductive material connected at one end to the pressure transducer and at the other end to the power receiving means.

4. A power transfer system as defined in claim 1, wherein the pressure sensing structure comprises an interconnected array of pressure transducers including an output connection coupled to the power transfer medium.

5. A power transfer system as defined in claim 4, wherein the array of pressure transducers are interconnected in parallel relationship to an output connection which cumulates voltage output from individual pressure transducers for transmission to the transfer medium.

6. A power transfer system as defined in claim 2, wherein the power receiving means comprises a battery storage system for storing electrical energy received from the output voltage.

7. A power transfer system as defined in claim 3, wherein the array of transducers are buried within a section of ocean floor at sufficient depth to be substantially undisturbed by currents and sea life.

8. A power transfer system as defined in claim 7, wherein the transfer medium comprises connecting wire at the ocean floor between the array of transducers and the power receiving means.

9. A power transfer system as defined in claim 3, wherein the array of pressure transducers comprises a mat of interconnected pressure transducers and connecting wires, said mat including a common output lead coupled to the transfer medium.

10. A power transfer system as defined in claim 2, wherein the pressure transducer includes:

a combination coil and magnet in relative movable relationship;

a moveable head plate coupled to the combination coil and magnet and being configured to respond directly to the changes in water pressure at the head plate to displace and induce movement within the relative movable relationship of the coil and magnet for activating a current within the coil; and restoring means coupled to the head plate for periodically restoring the head plate to a position during a trough of the overhead wave in preparation for a following displacement responsive to increased water pressure at the head plate generated by a following wave crest.

11. A power transfer system as defined in claim 10, further comprising a secondary plate movably coupled with the head plate and being configured to amplify any displacement of the head plate with increased displacement of the secondary plate with an attendant increased current output from the coil.

12. A power transfer system as defined in claim 11, further including:

a compression chamber bounded at an opening by the movable head plate;

the secondary plate forming a movable surface which is coupled at one side to the compression chamber and movably positioned at an opposing side within a conversion chamber of lesser diameter than the compression chamber and along an axial orientation of displacement;

said compression chamber having a fluid content which transfers force applied to the head plate into the secondary plate in response to displacement of the head plate and causes a volume displacement of the secondary plate within the conversion chamber;

said secondary plate having a lesser surface area than the head plate to cause increased linear displacement of the secondary plate as compared with displacement of the head plate;

said secondary plate being coupled to the combination of coil and magnet to translate said linear displacement into relative movement of the coil and magnet to generate the current within the coil.

13. A power transfer system as defined in claim 1, wherein the pressure sensing structure comprises a rotary plate coupled to a generator at a rotational axis.

14. A power transfer system as defined in claim 1, wherein the pressure sensing structure comprises a combination of magnet and coil which are positioned to develop an interacting relationship within a magnetic field of the magnet and with respect to the coil, the combination of magnet and coil being movable with respect to each other in response to the changing height and weight of water to thereby generate an electrical current within the coil, said coil being coupled to the power transfer system for delivering the electrical power output.

15. A power transfer system as defined in claim 1, wherein the pressure sensing structure includes:

a combination of magnet and coil in relative movable relationship for generating current within the coil;

a bellows having a movable plate and a stationary plate and a sealed compression chamber there between, said movable plate being coupled to the combination of magnet and coil and including a power transmission structure to translate plate movement to the relative movement of the magnet and coil;

said movable plate being depressible by an increased column height of water over the movable plate and including a restoring means for elevating the movable plate to a raised, rest position in response to lesser overhead water to generate a pumping action.

16. A power transfer system as defined in claim 1, wherein the power transmission structure includes a lever arm coupled at one end to the pressure sensing structure and at a remaining end to the combination of magnet and coil and including a fulcrum point which provides an increased range of motion for the combination magnet and coil as compared to the end coupled to the pressure sensing structure to increase a range of motion of relative movement between the coil and magnet.

17. A power transfer system as defined in claim 10, wherein the coil is in fixed position and the magnet moves with respect to the coil.

18. A power transfer system as defined in claim 10, wherein the magnet is in fixed position and the coil moves with respect to the magnet.

19. A power transfer system as defined in claim 1, wherein the pressure sensing structure includes:

a housing;

a head plate movably positioned at the housing, said head plate being supported in a movable configuration responsive to changing weight of overhead water based on the wave motion;

a resistive force coupled to the head plate for restoring the head plate position following depression in response to an overhead wave; and a combination magnet and coil interactively coupled to the head plate and within an attendant magnetic field such that movement of the head plate results in relative movement between the magnet and coil within the magnetic field to generate current within the coil.

20. A power transfer system as defined in claim 17, wherein the coil also comprises a spring mechanism for providing the resistive force, said magnet being supported within an internal volume of the coil and operable to generate a current within the coil based upon depression of the coil by the overhead wave and concurrent movement of the magnet within the coil.

21. A power transfer system as defined in claim 1, including:

a base plate;

at least one permanent magnet having a plate-like configuration;

a spring mechanism positioned below the magnet and supported by the base plate, said spring mechanism providing a resistive force to support the magnet below a column of water; and a conductive coil positioned around the magnet and within an attendant magnetic field;

the magnet, coil and spring mechanism be positioned and supported at the base plate to provide oscillating relative movement of the magnet with respect to the coil to generate an electrical current in response to overhead wave action.

22. A method for converting recurring wave movement within the ocean to useful energy, said method comprising the steps of:

a) positioning pressure sensing structure at least five feet below water level and at an ocean floor location; and b) generating electrical power output from the pressure sensing structure at the ocean floor location by direct electro-mechanical conversion of gravity force arising from changes in height of water between a wave crest and trough above the pressure sensing structure to electrical current at the ocean floor location.

23. A method as defined in claim 22, further comprising the step of generating current flow by causing relative movement of a magnet and field coil positioned at the ocean floor in response to changes in the force of overhead water above the pressure sensitive structure.

24. A method as defined in claim 22, further comprising the step of transferring the electrical power output to a shore location.

25. A method as defined in claim 23, wherein the generating step comprises the more specific step of rotationally displacing a plate member to apply rotational force to an electro-mechanical conversion device.

26. A power transfer system for converting recurring wave movement within the ocean to electrical energy said system comprising at least one pressure transducer positioned at a stationary location at an ocean floor at least five feet below water level and below a location of wave movement configured for (i) registering changes in height of water at alternating crests and troughs above the pressure sensing structure and (ii) providing direct electrical power output at the transducer corresponding to changes in force associated with the alternating crests and troughs.

27. A system as defined in claim 26, further comprising a transfer medium coupled at one end to the pressure sensing structure for receiving electrical power and at an opposing end to an electrically powered device.

28. A system as defined in claim 27, wherein the electrically powered device comprises a battery pack.

29. A system as defined in claim 27, wherein the transfer medium comprises a conducting wire extending along the ocean floor to a shore location.

* * * * *